United States Patent
Mitsuhashi et al.

(10) Patent No.: US 10,291,010 B2
(45) Date of Patent: May 14, 2019

(54) CONNECTION STRUCTURE OF SUPERCONDUCTING CABLES, SUPERCONDUCTING CABLE, AND ELECTRICAL TERMINAL STRUCTURE OF END PORTION OF SUPERCONDUCTING CABLE

(71) Applicant: FURUKAWA ELECTRIC CO., LTD., Chiyoda-ku, Tokyo (JP)

(72) Inventors: Takaharu Mitsuhashi, Tokyo (JP); Masashi Yagi, Tokyo (JP); Tomoya Nomura, Tokyo (JP); Jun Teng, Tokyo (JP); Jin Liu, Tokyo (JP); Ryou Nakayama, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 83 days.

(21) Appl. No.: 14/910,248

(22) PCT Filed: Jul. 29, 2014

(86) PCT No.: PCT/JP2014/069900
§ 371 (c)(1),
(2) Date: Feb. 5, 2016

(87) PCT Pub. No.: WO2015/019897
PCT Pub. Date: Feb. 12, 2015

(65) Prior Publication Data
US 2016/0190788 A1 Jun. 30, 2016

(30) Foreign Application Priority Data
Aug. 6, 2013 (JP) .................................. 2013-162882

(51) Int. Cl.
*H02G 15/34* (2006.01)
*H01R 4/68* (2006.01)

(52) U.S. Cl.
CPC ............... *H02G 15/34* (2013.01); *H01R 4/68* (2013.01); *Y02E 40/648* (2013.01)

(58) Field of Classification Search
CPC ...................................................... H02G 15/04
(Continued)

(56) References Cited

U.S. PATENT DOCUMENTS 5,949,131 A * 9/1999 Sato ...................... C04B 37/001
257/662
7,598,458 B2 10/2009 Yumura et al.
(Continued)

FOREIGN PATENT DOCUMENTS

CN 1809900 A 7/2006
CN 102396112 A 3/2012
(Continued)

OTHER PUBLICATIONS

International Search Report dated Oct. 28, 2014 for PCT Application No. PCT/JP2014/069900, 3 pages.
(Continued)

Primary Examiner — Stanley Tso
(74) Attorney, Agent, or Firm — Amin, Turocy & Watson, LLP (57) ABSTRACT

A connection structure is provided for a pair of superconducting cables each including a cable core including a former and a superconductive conductor layer composed of a plurality of superconducting wires arranged along an outer circumference of the former. The superconducting wire has a laminated structure including a base plate and a superconducting layer formed on a side closer to one of principal surfaces of the base plate. One of the superconducting cables and another of the superconducting cables are connected with each other by a first superconducting wire and a second superconducting wire such that the superconducting layers
(Continued)

of the first superconducting wire and the second superconducting wire face each other.

4 Claims, 5 Drawing Sheets

(58) Field of Classification Search
USPC ........................................... 174/84 R
See application file for complete search history.

(56) References Cited

U.S. PATENT DOCUMENTS

| | | | |
|---|---|---|---|
| 8,260,388 B2 | 9/2012 | Yagi et al. | |
| 2002/0020546 A1* | 2/2002 | Ueyama | H01L 39/02 174/125.1 |
| 2003/0029629 A1 | 2/2003 | Spreafico et al. | |
| 2012/0015816 A1* | 1/2012 | Yagi | H01R 4/68 505/230 |
| 2013/0102474 A1* | 4/2013 | Mukoyama | H01R 4/68 505/220 |
| 2016/0352027 A1* | 12/2016 | van der Laan | H01R 4/68 |

FOREIGN PATENT DOCUMENTS

| | | |
|---|---|---|
| JP | 2001319750 | 11/2001 |
| JP | 2007305386 A | 11/2007 |
| JP | 2008047519 | 2/2008 |
| JP | 2009136071 A | 6/2009 |
| JP | 2009240100 A | 10/2009 |
| JP | 2010123621 A | 6/2010 |
| WO | 2008118127 | 10/2008 |

OTHER PUBLICATIONS

International Preliminary Report on Patentability dated Feb. 9, 2016 for PCT Application No. PCT/JP2014/069900, 15 pages.
European Search Report dated Feb. 2, 2017 for European Application No. 14834634.9, 8 pages.
Chinese Office Action dated Aug. 8, 2016 for Chinese Application No. 201480040912.X, 15 pages.
Japanese Office Action dated May 30, 2017 for Japanese Application No. 2013-162882, 5 pages (with translation).
European Office Action dated Nov. 24, 2017 for European Application No. 14834634.9, 8 pages.

* cited by examiner

CONNECTION STRUCTURE OF SUPERCONDUCTING CABLES, SUPERCONDUCTING CABLE, AND ELECTRICAL TERMINAL STRUCTURE OF END PORTION OF SUPERCONDUCTING CABLE

CROSS-REFERENCE TO RELATED APPLICATIONS

This application is a U.S. National Stage patent application filing under 35 USC § 371 of international Patent Cooperation Treaty (PCT) Application No. PCT/JP2014/069900, filed on Jul. 29, 2014, and entitled "CONNECTION STRUCTURE OF SUPERCONDUCTING CABLES, SUPERCONDUCTING CABLE, AND CURRENT TERMINAL STRUCTURE AT END PORTION OF SUPERCONDUCTING CABLE," which claims priority to Japanese Patent Application No. 2013-162882, filed on Aug. 6, 2013, both of which applications are hereby incorporated by reference herein in their entireties.

TECHNICAL FIELD

The present invention relates to a connection structure of superconducting cables, a superconducting cable and an electrical terminal structure of an end portion of a superconducting cable.

BACKGROUND ART

A superconducting cable includes a cable core formed by laminating, for example, a superconductive conductor layer, an electrical insulation layer and a shield layer around a former, and a thermal insulation pipe of vacuum double pipe structure to accommodate the cable core. Inside of the thermal insulation pipe, liquid coolant having a very low temperature (for example, liquid nitrogen) is circulated to cool the cable core.

When the superconducting cable is used as a power supply line, the superconducting cable needs to be installed from a power supply to a distant power consuming area. However, a length of a single cable is limited due to reasons relating to the production and transportation of the superconducting cable. Therefore, a multiple superconducting cables need to be connected with each other when a cable having a long length is installed.

A tape-like superconducting wire in which a superconducting layer is formed on one side of a base plate is becoming general as the superconducting wire constituting the superconducting layer of the superconducting cable. When such superconducting wires are connected with each other, the superconducting wires need to be connected with each other such that the superconducting layers face each other.

However, since the superconductive conductor layer of the superconducting cable is generally composed of the superconducting wires with the superconducting layers facing outward, the superconducting wires which each constitute the superconductive conductor layers of the superconducting cables cannot be connected with each other as they are.

In Patent Document 1, when superconducting cables are connected with each other in a state where superconducting wires of each superconductive conductor layer face up (outward along the radial direction of the superconducting cable), superconducting wires for connection are attached therebetween in a suspended state such that the superconducting layers face down (inward along the radial direction of the superconducting cable) to realize a connection.

In Patent Document 2, a superconducting wire is proposed which includes superconducting layers on both sides thereof by applying the base plate sides of superconducting wires to each other.

PRIOR ART DOCUMENT

Patent Document

Patent Document 1: JP 2009-240100 A
Patent Document 2: JP 2007-305386 A

SUMMARY OF INVENTION

Problem to be Solved by the Invention

However, in the case of Patent Document 1 described above, since superconducting wires for connection are necessary for connection section of the superconductive conductor layers of the superconducting cables, there is a problem that cost of connection work is increased.

In the case of Patent Document 2, since the superconducting wire has a structure formed by applying two superconducting wires to each other, required amount of superconducting wires is doubled and the cost of material itself of the superconducting cable is increased.

An object of the present invention is to provide a connection structure employing superconducting cables, a superconducting cable and an electrical terminal structure at an end portion of a superconducting cable, which are excellent with respect to cost.

Means for Solving the Problem

The present invention relating to a connection structure of superconducting cables is a connection structure of a pair of superconducting cables each including a cable core including a former and a superconductive conductor layer composed of a plurality of superconducting wires arranged along an outer circumference of the former, wherein each of the plurality of superconducting wires has a laminated structure including a base plate and a superconducting layer formed on a side closer to one of principal surfaces of the base plate, at least one of the plurality of superconducting wires in the superconductive conductor layer of one of the superconducting cables is a first superconducting wire in which the superconducting layer is arranged inside of the base plate along a radial direction of the cable core, at least one of the plurality of superconducting wires in the superconductive conductor layer of another of the superconducting cables is a second superconducting wire in which the superconducting layer is arranged outside of the base plate along a radial direction of the cable core, and the one of the superconducting cables and the another of the superconducting cables are connected with each other by the first superconducting wire and the second superconducting wire such that the superconducting layers of the first superconducting wire and the second superconducting wire face each other.

Since at least a part of the superconductive conductor layer of the one of the superconducting cables is composed of the first superconducting wire in which the superconducting layer are arranged inside of the base plate along the radial direction of the cable core and at least a part of the superconductive conductor layer of the another of the superconducting cables is composed of the second superconducting wire in which the superconducting layer is arranged outside of the base plate along a radial direction of the cable core, at least respective first and second superconducting wires can be connected such that the superconductive conductor layers face each other.

Thus, connecting the superconductive conductor layers of the superconducting cables is possible without using superconducting wires for connection or by using reduced superconducting wires for connection. With respect to the superconducting wires which constitute the superconductive conductor layer, the superconducting wire having superconducting layers on both sides can be made unnecessary or can be reduced.

Thus, the superconducting wires for connection or the superconducting wires having superconducting layers on both sides are made unnecessary or reduced. Reducing cost for connection work is also made possible.

In accordance with the present invention, in addition to the configuration described above, a configuration may be adopted in which a distribution of arrangement of the first superconducting wires along a circumferential direction of the cable core of the one of the superconducting cables and a distribution of arrangement of the second superconducting wires along a circumferential direction of the cable core of the another of the superconducting cables are identical.

When tip portions of the superconducting cables are opposed to each other, if the distribution of arrangement of the first superconducting wires of the one of the superconducting cables and the distribution of arrangement of the second superconducting wires of the another of the superconducting cables are identical, all the superconducting wires can be connected with each other such that the superconducting layers face each other, and reducing the resistance at a connection section is possible.

Thus, reducing loss during a connection is made possible without using a superconducting cable which has superconducting layers on both sides and which produces high material cost.

In accordance with the present invention, in addition to the configuration described above, a configuration may be adopted in which the first superconducting wires and the second superconducting wires of the superconductive conductor layer of each of the superconducting cables are arranged so as to switch periodically along an outer circumference of the former.

When the superconducting cables in which the first superconducting wires and the second superconducting wires are arranged so as to switch periodically in the superconductive conductor layers, all the superconducting wires can be connected with each other such that the superconducting layers thereof face each other and reducing the resistance at the connection section is made possible.

Thus, reducing loss during a connection is made possible without using a superconducting cable which has superconducting layers on both sides and which produces high material cost.

In accordance with the present invention, in addition to the configuration described above, a configuration may be adopted in which the superconductive conductor layer of the one of the superconducting cables is composed only of the first superconducting wires and the superconductive conductor layer of the another of the superconducting cables is composed only of the second superconducting wires.

When the one of the superconducting cables in which the superconductive conductor layer is composed of the first superconducting wires and the another of the superconducting cables in which the superconductive conductor layer is composed of the second superconducting wires are connected with each other, all the superconducting wires can be connected with each other such that the superconducting layers thereof face each other and reducing the resistance at the connection section is made possible.

Thus, reducing loss due to a connection is made possible without using a superconducting cable which has superconducting layers on both sides and which produces high material cost.

The present invention is a superconducting cable including a cable core including a former and a superconductive conductor layer, wherein the superconductive conductor layer is composed of a plurality of superconducting wires arranged along an outer circumference of the former, each of the plurality of superconducting wires includes a laminated structure including a base plate and a superconducting layer formed on a side closer to one of a principal surfaces of the base plate, and the superconductive conductor layer includes a first superconducting wire which is arranged such that the superconducting layer is located inside of the base plate along a radial direction of the cable core and a second superconducting wire which is arranged such that the superconducting layer is located outside of the base plate along the radial direction of the cable core.

When the superconducting cables which each include the first superconducting wire and the second superconducting wire in the superconductive conductor layer are connected with each other, some superconducting wires can be brought into a state where the superconducting layers of the first superconducting wires and the second superconducting wires face each other by connecting the superconducting cables with each other such that the second superconducting wires of each superconducting cable are located inside and the first superconducting wires of each superconducting cable are located outside.

Thus, connecting the superconducting wires in the superconductive conductor layers of the superconducting cables is possible without using superconducting wires for connection or by using reduced superconducting wires for connection. With respect to the superconducting wires which constitute the superconductive conductor layer, the superconducting wire having superconducting layers on both sides can be made unnecessary or can be reduced. Thus, an additional superconducting wire is made unnecessary when the superconducting cable are produced and when the cables are connected with each other.

Providing a superconducting cable is possible which enables material cost and cost for connection work to be reduced.

In accordance with the present invention relating to the superconducting cable, in addition to the configuration described above, the first superconducting wire and the second superconducting wire of the superconductive conductor layer are arranged so as to switch periodically along a circumferential direction of the former.

When the superconducting cables are connected with each other in which the first superconducting wires and the second superconducting wires are arranged so as to switch periodically in the superconductive conductor layer, all the superconducting wires can be connected with each other such that the superconducting layers thereof face each other and reducing the resistance at the connection section is made possible.

Thus, providing a superconducting cable which is cost-effective and which produces low loss when the superconducting cables are connected with each other is possible.

In the present invention relating to an electrical terminal structure of an end portion of the superconducting cable having the configuration described above, a superconducting wire for connection is provided inside of an end portion of the first superconducting wire along the radial direction of the cable core, the superconducting wire for connection being in a state where the superconducting layer is located outside of the base plate along the radial direction of the cable core, the superconducting wire for connection extends from the end portion of the first superconducting wire in an extending direction thereof, and the superconducting layers of the superconducting wire for connection and the first superconducting wire are connected with each other.

At an end connection section, a conductor is used which is brought into contact with and connected with the outer circumference of the end portion of the cable core of the superconducting cable. Since a superconducting wire for connection is connected with and extended from the first superconducting wire of the superconducting cable and the superconducting wire for connection is in a state where the superconducting layer is located outside of the base plate along the radial direction of the cable core, all the superconducting wires are in a state where the superconducting layers face outward at the end portion, and thus, a good connection with an external part can be realized.

Effects of the Invention

In accordance with the invention described above, when the superconductive conductor layers of the superconducting cables are connected with each other, superconducting wires having superconducting layers on both sides are not used or necessary amount thereof is reduced, and superconducting wires for connection are not used or necessary amount thereof is reduced. The material cost for the superconducting cable and the cost for connection work can be reduced.

DESCRIPTION OF PREFERRED EMBODIMENTS

First Embodiment

Hereinafter, a first preferred embodiment of the present invention will be described with reference to the drawings. Though various technical limitations which are preferable to carry out the present invention are added to the embodiment described below, the scope of the invention is not limited to the following embodiment and the illustrated examples.

[Superconducting Cable]

Figure 1:
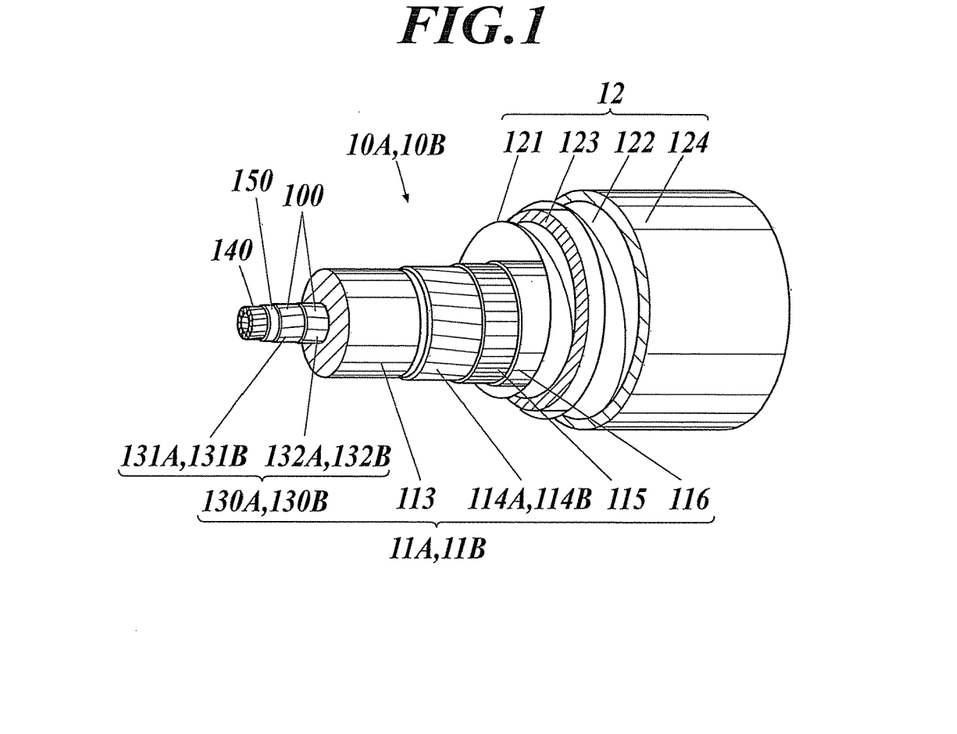
FIG. 1 is a perspective view showing a structure of a superconducting cable.

FIG. 1 shows an example of a superconducting cable.

A superconducting cable 10A (10B) is a single core superconducting cable in which a single cable core 11A (11B) is accommodated in a thermal insulation pipe 12. The cable core 11A (11B) is composed of a former 140, a superconductive conductor layer 130A (130B), an electrical insulation layer 113, a superconductive shielding layer 114A (114B), a normal conductive shielding layer 115, a protective layer 116 and the like.

The superconducting cable 10A and the superconducting cable 10b which are to be connected with each other (these superconducting cables 10A, 10B to be connected with each other are referred to as a pair of superconducting cables) are slightly different from each other in the structures thereof in the superconductive conductor layers and the superconductive shielding layers. These differences will be described hereinafter and common structures of the superconducting cables 10A, 10B will be described first.

The former 140 is a member to form the cable core 11A (11B) and is constituted by twisting conductive materials such as copper together, for example. When a short circuit accident occurs, a fault current which flows to the superconductive conductor layer 130A (130B) is divided to the former 140.

The internal portion of the former 140 is formed to be hollow and the hollow portion is supplied with liquid coolant (for example, liquid nitrogen) to cool the former 140 and the superconductive conductor layer 130A (130B). This liquid coolant is the same as that supplied around the cable core 11A (11B) in the thermal insulation pipe 12 described below.

The superconductive conductor layer 130A (130B) is formed by spirally winding a plurality of superconducting wires 100 around the former 140 via carbon paper 150. In FIG. 1, the superconductive conductor layer 130A (130B) is formed as a laminated structure including two layers. Along the radial direction of the cable core 11A (11B), an inner side layer is a first superconductive conductor layer 131A (131B) and an outer side layer is a second superconductive conductor layer 132A (132B). An electrical current for transmitting electrical power flows through the superconductive conductor layer 130A (130B) in a steady-state operation.

Figure 2:
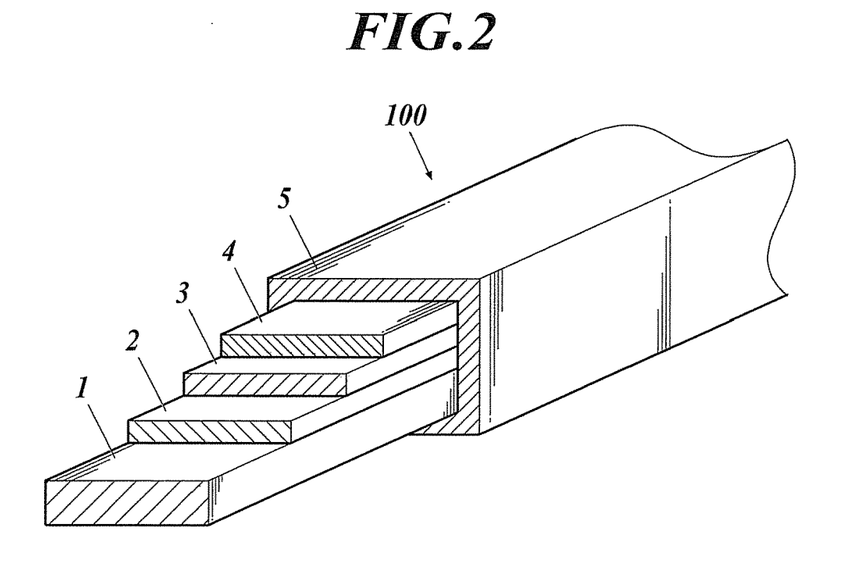
FIG. 2 is an explanatory view showing a layer configuration of a superconducting wire.

The superconducting wire 100 which constitutes the superconductive conductor layer 130A (130B) is, for example, as shown in FIG. 2, a tape-like superconducting wire including a laminated structure in which, on one of the principal surfaces (one surface in a thickness direction) of a base plate 1, an intermediate layer 2, a superconducting layer 3 and a protective layer 4 are laminated in this order, and a stabilizing copper layer 5 which covers a surrounding of the laminated structure.

A typical superconductor which constitutes the superconducting layer 3 is a RE based superconductor (RE: rare earth element), which becomes superconductive at the temperature of liquid nitrogen or more, such as an yttrium based superconductor having the chemical formula of $YBa_2Cu_3O_{7-y}$ (hereinafter referred to as a Y based superconductor).

The electrical insulation layer 113 is constituted by a kind of insulating paper such as insulating paper, semisynthetic paper in which a piece of insulating paper and a polypropylene film are bonded with each other and polymeric nonwoven fabric tape. The electrical insulation layer 113 is formed as a laminated state by being wound on the superconductive conductor layer 130A (130B).

The superconductive shielding layer 114A (114B) is formed by spirally winding a plurality of superconducting wires around the electrical insulation layer 113 via carbon paper (not shown). In FIG. 1, the superconductive shielding layer 114A (114B) is formed as a laminated structure including one layer. A current which has substantially the same magnitude as that of the conductor current and has a phase opposite to that of the conductor current flows through the superconductive shielding layer 114A (114B) during the steady-state operation due to electromagnetic induction. The superconductive shielding layer 114A (114B) functions so as not to leak to the outside the magnetic field which is generated when a large current flows through the superconductive conductor layer 130A (130B).

The superconducting wire 100 (refer to FIG. 2) similar to those of the superconductive conductor layer 130A (130B) can be applied to the superconducting wire which constitutes the superconductive shielding layer 114A (114B).

The normal conductive shielding layer 115 is formed by winding a conductive material such as a copper wire on the superconductive shielding layer 114A (114B). A fault current which flows to the superconductive shielding layer 114A (114B) is divided to the normal conductive shielding layer 115 when a short circuit accident occurs.

The protective layer 116 is constituted by, for example, insulating paper, polymeric nonwoven fabric or the like, which is wound around the normal conductive shielding layer 115.

The thermal insulation pipe 12 has a double pipe structure composed of a thermal insulation inner pipe 121 which accommodates the cable core 11A (11B) and is filled with coolant (for example, liquid nitrogen) and a thermal insulation outer pipe 122 which is provided so as to cover the outer circumference of the thermal insulation inner pipe 121.

The thermal insulation inner pipe 121 and the thermal insulation outer pipe 122 are, for example, corrugated pipes of stainless steel. A multi-layer insulation (superinsulation) 123 composed of, for example, a lamination of polyethylene films on which aluminum or the like is evaporated is provided between the thermal insulation inner pipe 121 and the thermal insulation outer pipe 122 and a vacuum state is maintained between the thermal insulation inner pipe 121 and the thermal insulation outer pipe 122. The outer circumference of the thermal insulation outer pipe 122 is covered with a corrosion protection layer 124 such as polyvinyl chloride (PVC) and polyethylene.

[Connection Structure of Superconducting Cables: Summary]

When the superconducting cables 10A, 10B are connected with each other, an intermediate connection section is used which connects the thermal insulation pipes 12, 12 of the superconducting cables (not shown). The intermediate connection section has a double wall structure similar to that of the thermal insulation pipe 12. Vacuum state is maintained between the walls and coolant is circulated inside of the intermediate connection section. In addition, the cable cores 11A, 11B of the respective superconducting cables 10A, 10B are connected with each other inside of the intermediate connection section.

In a connection structure of the cable cores 11A, 11B, the tip surfaces of the formers 140, 140 are brought into an abutting state with each other and are connected by welding or a crimping sleeve.

With respect to the superconductive conductor layers 130A, 130B, the superconducting wires 100 which constitute the superconductive conductor layers 130A, 130B are separately connected with each other by solder at an outer circumference of the connected section of the formers 140, 140. This connection structure will be described below.

The tip portion of the electrical insulation layer 113, 113 of each of the cable core 11A, 11B is formed so as to have a circular cone shape being thinned toward the tip portion at a position receded from the tip portion of the former 140, 140 by striping the electrical insulation layer 113, 113. Insulating paper of the same kind as that of the electrical insulating layer 113 is wound around a recessed portion formed by the circular cone shapes of the electrical insulating layers 113, 113 so as to form an auxiliary insulating layer (not shown). Around an outer circumference of the auxiliary insulating layer, the superconductive shielding layer 114A, the normal conductive shielding layer 115 and the protective layer 116 are connected with the superconductive shielding layer 114B, the normal conductive shielding layer 115 and the protective layer 116, respectively, so as to cover the auxiliary insulating layer (not shown).

[Connection of Superconductive Conductor Layers of Superconducting Cables]

Figure 3:
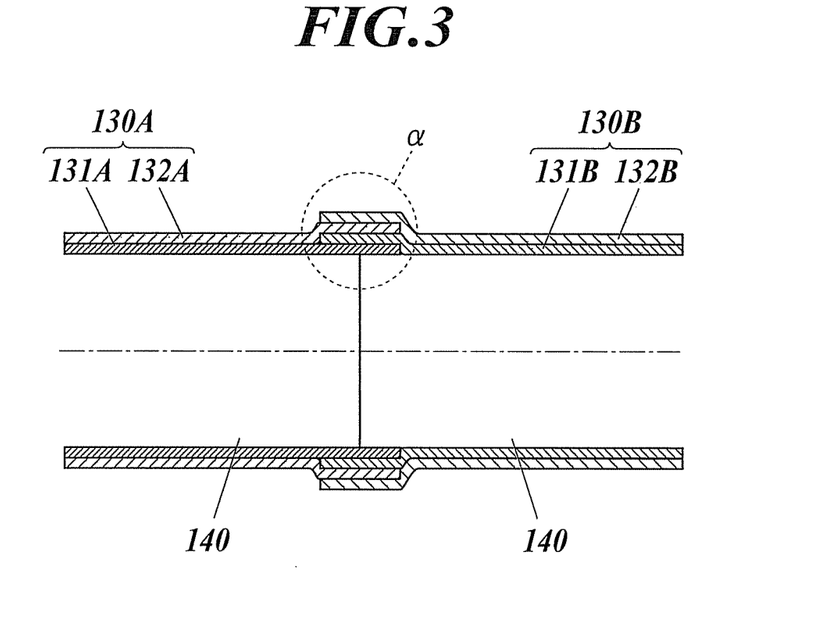
FIG. 3 is a cross sectional view showing a connection state of superconductive conductor layers at outer circumferences of connected formers.
Figure 4:
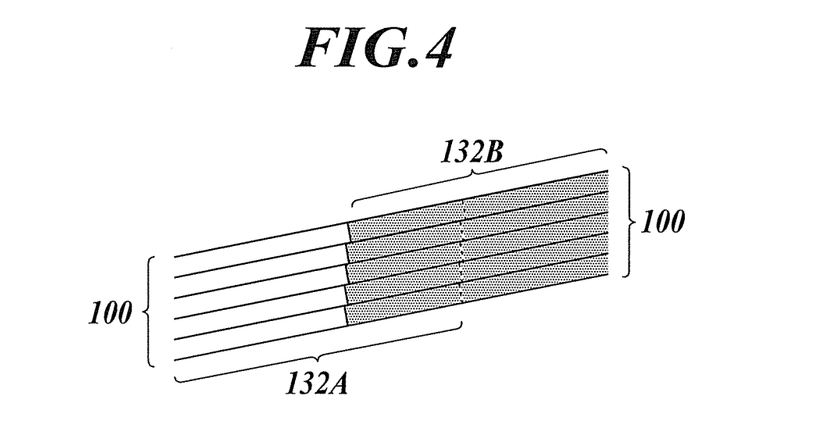
FIG. 4 is an enlarged view of region a in FIG. 3 seen above.

FIG. 3 is a cross-sectional view of a connection state of the superconductive conductor layers 130A, 130B around an outer circumference of the connected formers 140, 140. FIG. 4 is an enlarged view of a region a in FIG. 3 seen from above (FIG. 4 shows only some among all the superconducting wires 100).

With respect to the first superconductive conductor layers 131A, 131B and the second superconductive conductor layers 132A, 132B of the superconducting cables 10A, 10B, a plurality of superconducting wires 100 are arranged densely and next to each other so as to extend spirally along a circumference around the center axis of the former 140, 140.

As shown in FIG. 4, with respect to the first and second superconductive conductor layers 131A, 132A of the superconducting cable 10A, all the superconducting wires 100 thereof are arranged next to each other such that each of the superconducting layers 3 is located outside of the base plate 1 along a radial direction of the cable core 11A.

On the other hand, as shown in FIG. 4, with respect to the first and second superconductive conductor layers 131B, 132B of the other superconducting cable 10B, all the superconducting wires 100 are arranged next to each other such that each of the superconducting layers 3 is located inside of the base plates 1 along a radial direction of the cable core 11B.

The state where the superconducting layer 3 is located outside of the base plate 1 (outside along the radial direction of the cable core 11A (11B) around the center axis of the former 140) will be referred to as a state where the superconducting wire 100 is facing up (a second superconducting wire), and the state where the superconducting layer 3 is located inside of the base plate 1 (inside along the radial direction of the cable core 11A (11B) around the center axis of the former 140) will be referred to as a state where the superconducting wire 100 is facing down (a first superconducting wire).

In FIG. 4, in order to distinguish the superconducting wire 100 facing up from that facing down, the superconducting wire 100 facing down is shown with a pattern.

As shown in FIG. 4, the superconductive conductor layer 130A of the superconducting cable 10A and the superconductive conductor layer 130B of the superconducting cable 10B are connected by solder in a state where tip portions thereof are overlapped with each other such that each superconducting wire 100 of the superconductive conductor layer 130A is located inside along the radial direction of the cable core 11A and each superconducting wire 100 of the superconductive conductor layer 130B is located outside along the radial direction of the cable core 11B. Therefore, the superconducting wires 100 are brought into a state where surfaces thereof closer to the respective superconducting layers 3 face each other. Connecting the superconducting layers 3 with each other without locating the base plate 1 therebetween is made possible.

Although only the second superconductive conductor layers 132A, 132B are shown and the illustration of the first superconductive conductor layers 131A, 131B is omitted in FIG. 4, the superconducting wires 100 of the first superconductive conductor layers 131A, 131B are respectively connected with each other in a similar manner.

Although FIG. 3 shows a case where the connection section of the first superconductive conductor layers 131A, 131B and the connection sections of the second superconductive conductor layers 132A, 132B are located at the same position, each of these connection sections may be formed at locations different from each other along an axial direction of the former 140, 140.

[Connection of Superconductive Shielding Layers of Superconducting Cables]

Also, with respect to the superconductive shielding layers 114A, 114B of the superconducting cables 10A, 10B, a plurality of superconducting wires 100 thereof are arranged densely and next to each other so as to extend spirally along a circumference around the center axis of the former 140, 140.

In addition, all the superconducting wires 100 in the superconductive shielding layer 114A are arranged so as to face up and all the superconducting wires 100 in the superconductive shielding layer 114B are arranged so as to face down.

In the connection section, each superconducting wire 100 of the superconducting shielding layer 114A and each superconducting wire 100 of the superconducting shielding layer 114B are connected with each other by solder in a state where tip portions thereof are overlapped with each other such that each superconducting wire 100 of the superconducting shielding layer 114A is located inside along the radial direction of the cable core 11A (11B) and each superconducting wire 100 of the superconducting shielding layer 114B is located outside along the radial direction of the cable core 11A (11B). Therefore, the superconducting wires 100 are connected with each other in a state where surfaces thereof closer to the superconducting layers 3 face each other.

[Technological Effects of First Embodiment]

In this way, by using the superconducting cable 10A in which all the superconducting wires 100 of the superconductive conductor layer 130A are facing up and the superconducting cable 10B in which all the superconducting wires 100 of the superconductive conductor layer 130B are facing down, connecting the superconducting wires 100 of the superconductive conductor layers 130A and the superconducting wires 100 of the superconductive conductor layer 130B with each other is made possible in a state where the superconducting layers 3 thereof face each other in the connection structure.

This allows the resistance at the connection section of the superconducting wires 100 to be reduced, and thus, the reduction of loss and heat generation due to the resistance is made possible.

Similarly, since the superconductive shielding layers 114A, 114B of the superconducting cables 10A, 10B are also connected with each other in a state where the superconducting layer 3 of the superconducting wires 100 face each other, the reduction of loss and heat generation due to the resistance is made possible in the connection section of the superconducting wires 100.

In addition, in the above-described connection structure of the superconducting cables 10A, 10B, when the superconducting wires 100 of the superconductive conductor layer 130A and the superconducting wires 100 of the superconductive conductor layer 130B are connected with each other and the superconducting wires 100 of the superconductive shielding layer 114A and the superconducting wires 100 of the superconductive shielding layer 114B are connected with each other, preparing superconducting wires for connection in advance is not necessary because the superconducting wires 100 only have to be overlapped and connected such that the superconducting layers 3 thereof face each other, and expensive superconducting wires are made unnecessary and the reduction of cost for connection work is made possible because there is no need to use superconducting wires having superconducting layers on both sides.

Second Embodiment

In the first embodiment described above, as an example, the connection structure is shown where all the superconducting wires 100 of each of the superconductive conductor layers 131A, 132A of the superconducting cable 10A are provided so as to face up and all the superconducting wires 100 of each of the superconductive conductor layers 131B, 132B of the superconducting cable 10B are provided so as to face down. However, the arrangement of each superconducting wire 100 is not limited thereto.

For example, a plurality of superconducting wires 100 which constitute the superconductive conductor layer may be arranged so as to switch between facing up and down periodically along a circumferential direction around the center axis of the former 140. That is, the first superconducting wire (s) and the second superconducting wire(s) in the superconductive conductor layer may be arranged so as to switch each other periodically along a circumferential direction around the center axis of the former.

Figure 5:
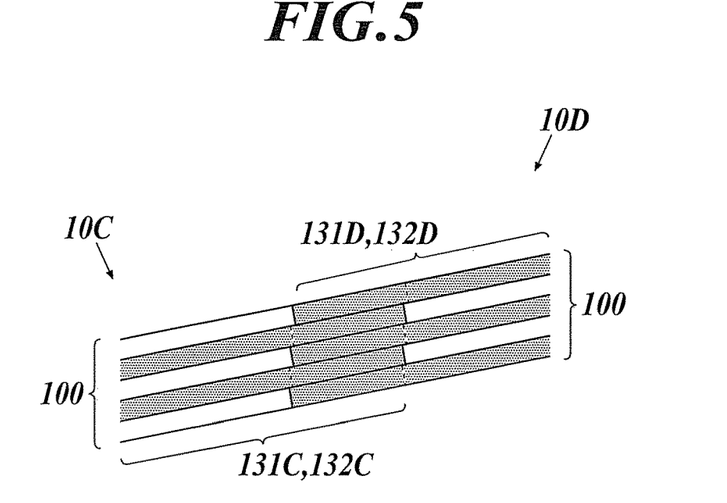
FIG. 5 is an enlarged view of another example of an arrangement of superconducting wires seen above.

For example, as shown in FIG. 5, in the superconducting cables 10C, 10D, the superconducting wires 100 are arranged so as to switch between facing up and down one by one alternatively. The superconducting wires 100 constitute, as the superconductive conductor layers of the superconducting cables 10C, 10D, a first superconductive conductor layer 131C, a second superconductive conductor layer 132C, a first superconductive conductor layer 131D and a second superconductive conductor layer 132D.

Owing to the above-described arrangement, when tip portions of the superconducting cables 10C, 10D are placed so as to face each other, it is possible to align a distribution of arrangement of the superconducting wires 100 facing down which is arranged along the circumferential direction around the center axis of the former 140 of the superconducting cable 10C, and a distribution of arrangement of the superconducting wires 100 facing up which is arranged along the circumferential direction around the center axis of the former 140 of the other superconducting cable 10D.

Therefore, it is possible to connect all the superconducting wires 100 facing up of the superconducting cables 10C and 10D and all the superconducting wires 100 facing down of the superconducting cables 10C and 10D with each other in a state where the sides of the superconducting wires 100 closer to the respective superconducting layers 3 face each other.

Superconductive wires having superconducting layers on both sides are thereby made unnecessary and providing the superconducting cables 10C, 10D which are excellent with respect to material cost is made possible.

In addition, since a superconducting wires for connection is made unnecessary, providing a connection structure of superconducting cables which is excellent with respect to cost of work.

Furthermore, by connecting all the superconducting wires 100 which respectively constitute the superconductive conductor layers of the superconducting cables 10C, 10D with each other in a state where the sides of the superconducting wires closer to the superconducting layers 3 face each other, reducing resistance and reducing heat generation and loss is made possible.

Figure 6:
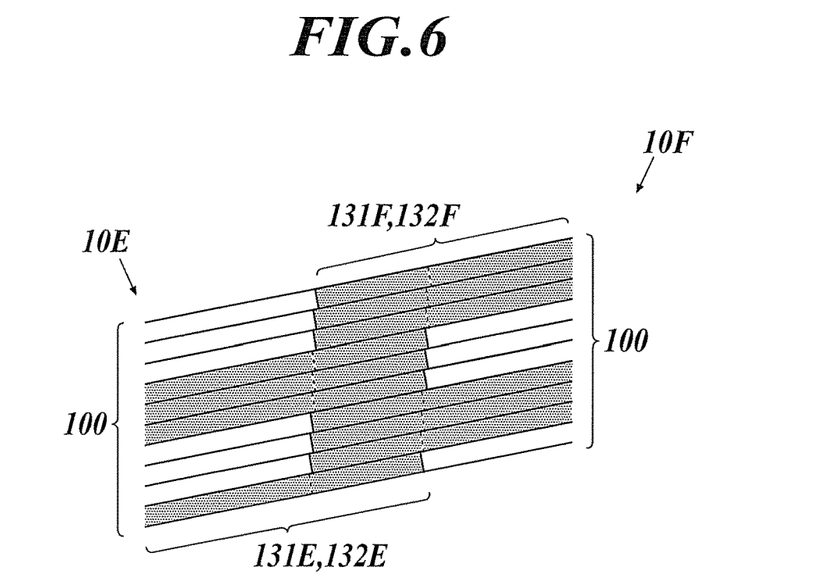
FIG. 6 is an enlarged view of another example of an arrangement of superconducting wires seen above.

With respect to an arrangement of the superconducting wires 100, as shown in each superconducting cable 10E, 10F in FIG. 6, the superconducting wires 100 may be arranged so as to switch between facing up and down every predetermined number (In FIG. 6, the number of three is shown as an example, but this is not limitative). The superconducting wires 100 constitute a first superconductive conductor layer 131E, a second superconductive conductor layer 132E, a first superconductive conductor layer 131F and a second superconductive conductor layer 132F as respective superconductive conductor layers.

In this case also, when tip portions of the superconducting cables 10E, 10F are placed so as to face each other, it is possible to align a distribution of arrangement of the superconducting wires 100 facing down which is arranged along the circumferential direction around the center axis of the former 140 of the superconducting cable 10E, and a distribution of arrangement of the superconducting wires 100 facing up which is arranged along the circumferential direction around the center axis of the former 140 of the other superconducting cable 10F.

Connecting all the superconducting wires 100 of the superconducting cables 10E and 10F is made possible in a state where the sides of the superconducting wires 100 closer to the respective superconducting layers 3 face each other.

Therefore, also in this case, a superconductive wire having superconducting layers on both sides is made unnecessary and providing the superconducting cables 10E, 10F which are excellent with respect to material cost is made possible.

In addition, since a superconducting wire for connection is made unnecessary, providing a connection structure of superconducting cables which is excellent with respect to cost of work is made possible.

Furthermore, since all the superconducting wires 100 which respectively constitute the superconductive conductor layers of the superconducting cables 10E, 10F are connected with each other in a state where the sides of the superconducting wires closer to the superconducting layers 3 face each other, reducing resistance and reducing heat generation and loss are made possible.

With respect to the superconductive conductor layer of at least one of the superconducting cables which are to be connected with each other, although there may be a case where not all the superconducting layers of the superconducting wires can be placed so as to face each other, both of the superconducting wire(s) facing up and the superconducting wire(s) facing down may exist. With respect to the one of the superconducting cables, there is no limitation with respect to a rate of the number of the superconducting wires facing up to the number of the superconducting wires facing down, and the periodicity or regularity of the arrangement of the superconducting wires facing up or down may be random. In that case, with respect to the other one of the superconducting cables, each superconducting wire may all face up or down. Even if there are both the superconducting wire(s) facing up and the superconducting wire(s) facing down, there is no limitation with respect to a rate of the number of the superconducting wires facing up to the number of the superconducting wires facing down. The periodicity or regularity of the arrangement of the superconducting wires facing up or down may be random.

Figure 7:
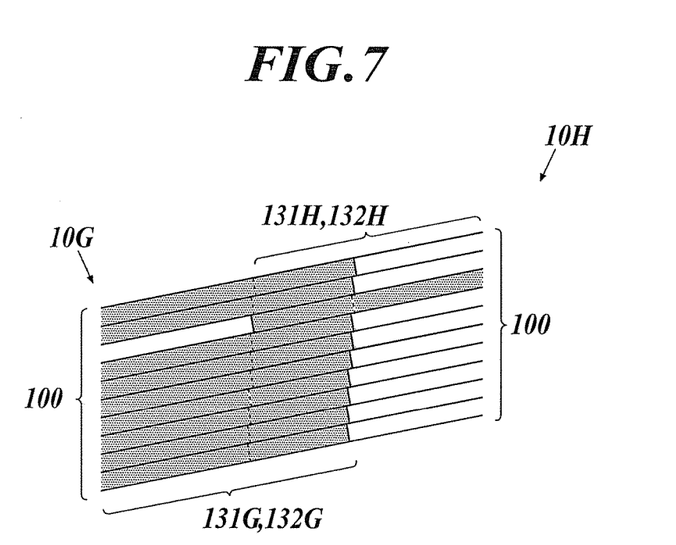
FIG. 7 is an enlarged view of another example of an arrangement of superconducting wires seen above.

For example, as shown in FIG. 7, the superconducting wires 100 which constitute a first superconductive conductor layer 131G and a second superconductive conductor layer 132G as the superconductive conductor layers of the superconducting cable 10G include, in one of the superconductive conductor layers, only one superconducting wire 100 facing up and the remaining superconducting wires 100 are facing down. The superconducting wires 100 which constitute a first superconductive conductor layer 131H and a second superconductive layer 132H of the superconducting cable 10H include, in one of the superconductive conductor layers, only one superconducting wire 100 facing down and the remaining superconducting wires 100 are facing up.

In this case, when tip portions of the superconducting cables 10G, 10H are placed so as to face each other, by aligning the superconducting cable 100 facing up of the superconducting cable 10G and the superconducting cable 100 facing down of the superconducting cable 10H along the circumferential direction around the former 140, all the superconducting wires 100 can be connected with the other superconducting wires 100 in a state where the superconducting layers 3 face each other without a superconducting wire for connection.

Therefore, also in this case, a superconducting wire having superconducting layers on both sides is made unnecessary and providing the superconducting cables 10G, 10H which are excellent with respect to material cost is made possible.

In addition, since a superconducting wire for connection is made unnecessary, providing a connection structure of superconducting cables which is excellent with respect to cost of work is made possible.

In a case where the superconducting wire 100 facing up of the superconducting cable 10G and the superconducting wire 100 facing down of the other superconducting cable 10H are not aligned along the circumferential direction around the former 140, among the superconducting wires 100 of the superconducting cables 10G, 10H, there is a combination composed of the superconducting wires 100 both facing up or the superconducting wires 100 both facing down. In such a case, a superconducting wire for connection may be used for connecting the superconducting wires 100, 100. In this case, although the superconducting wire for connection is necessary, since the number of combinations composed of the superconducting wires 100 both facing up or the superconducting wires 100 both facing down is smaller than that of prior art, providing a connection structure which is excellent with respect to cost of work is made possible.

In FIGS. 5 to 7, in order to distinguish the superconducting wire 100 facing up from that facing down, the superconducting wire 100 facing down is shown with a pattern.

In addition, the distribution of arrangement of the superconducting wires 100 facing up or down shown in FIGS. 5 to 7 can be applied to the arrangement of the superconducting wires facing up or down in the superconductive shielding layer of each of the superconducting cables 10C to 10G.

Third Embodiment

An end portion of the superconducting cable in a state where an outer circumferential surface of the superconductive conductor layer is exposed is introduced into a conductor sleeve which is electrically connected to an external device to transmit electricity to the external device and to receive electricity from the external device.

In this case, if there is a superconducting wire facing down among a plurality of superconducting wires which constitute the superconductive conductor layer of the superconducting cable, the superconducting wire facing down is connected with the conductor sleeve on a side closer to the base plate of the superconducting wire, and thus, the resistance between the superconducting wire and the conductor sleeve becomes larger. Therefore, an electrical terminal structure described below is provided for a superconducting cable which includes a superconductive conductor layer including a superconducting wire facing down at the end portion.

Figure 8:
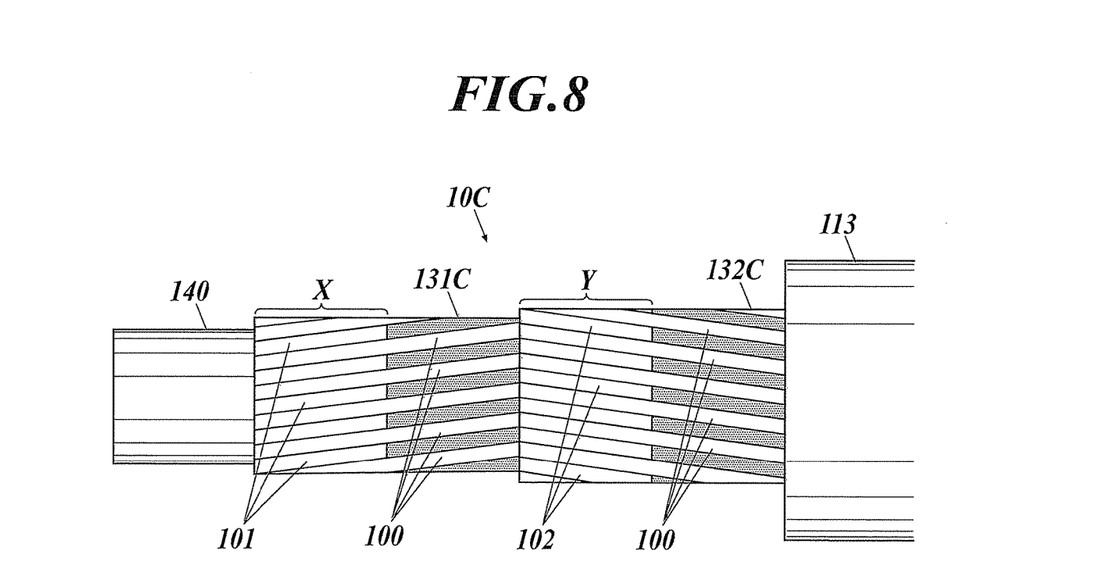
FIG. 8 is a side view showing a case where an electrical terminal structure is provided at the superconducting cable.

Hereinafter, a case where the superconducting cable 10C described above is provided with the electrical terminal structure is shown as an example. As shown in FIG. 8, on the the end portion side of the superconducting cable 10C, the end portions of the electrical insulation layer 113 and each of outer layers are removed such that the outer circumferential surfaces of the first and second superconductive conductor layers 131C, 132C are exposed, and the end portion side of the second superconductive conductor layer 132C is partly removed such that the outer circumferential surface of the first superconductive conductor layer 131C is exposed.

Superconducting wires 101, 102 for connection is extended from and connected to all the superconducting wires 100 facing down of each of the superconductive conductor layers 131C, 132C.

Figure 9:
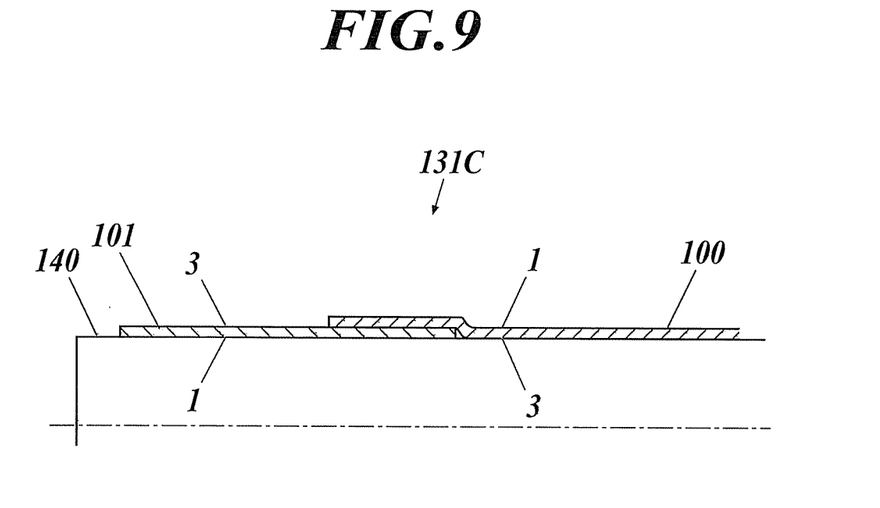
FIG. 9 is an explanatory view showing in a cross section along the center of the former a state where the superconducting wire for connection is connected with all the superconducting wires facing down of a first superconductive conductor layer.

FIG. 9 is an explanatory view showing, in a cross section along the center of the former 140, a state where the superconducting wire 101 for connection is extended from and connected with the superconducting wire 100 facing down of the first superconductive conductor layer 131C.

In FIG. 8, the superconducting wires 100 facing down are shown with patterns to distinguish the superconducting wires 100 facing down from the superconducting wires 100 facing up. In FIG. 9, the base plate 1 side and the superconducting layer 3 side of the superconducting wire 100 are shown by reference numerals.

As shown in FIG. 9, at the end of the end portion side of the superconducting wire 100 facing down, an end of the superconducting wire 101 for connection is inserted between the superconducting wire 100 facing down and the former 140 (strictly specking carbon paper).

The superconducting wire 101 for connection has the same structure (refer to FIG. 2) and the same width as the superconducting wire 100, and has a short strip-like shape. The superconducting wire 101 for connection is inserted such that the superconducting layer 3 is facing outward along the radial direction of the cable core with respect to the base plate 1. Thereby, at one end of the superconducting wire 101 for connection, the superconducting layer 3 of the superconducting wire 101 for connection is connected with the superconducting layer 3 of the superconducting wire 100 facing down of the first superconductive conductor layer 131C so as to face each other. At the other end of the superconducting wire 101 for connection, the superconducting layer 3 of the superconducting wire 101 for connection is exposed so as to face outward along the radial direction of the cable core.

Thereby, the superconducting wire 100 facing down of the first superconductive conductor layer 131C can be brought into contact with an external conductor sleeve via the superconducting layer 3 of the superconducting wire 101 for connection. Reducing the resistance between the superconducting wire 100 facing down and the external conductor sleeve and reducing heat generation and loss are made possible.

With respect to the second superconductive conductor layer 132C, similarly to the case of the first superconductive conductor layer 131C, at each end of the end portion side of all the superconducting wires 100 facing down, one end of the superconducting wire 102 for connection facing up is inserted between the superconducting wire 100 facing down and the first superconductive conductor layer 131C. The superconducting wire 102 for connection has the same structure as the superconducting wire 101 for connection described above.

Thereby, the superconducting wire 100 facing down of the second superconductive conductor layer 132C can also be brought into contact with an external conductor sleeve via the superconducting layer 3 of the superconducting wire 102 for connection. Reducing the resistance between the superconducting wire 100 facing down and the external conductor sleeve and reducing heat generation and loss are made possible.

The length of the superconducting wire 102 for connection extending from the tip portion of the second superconductive conductor layer 132C is desirably within such a range that the superconducting wire 102 for connection does not reach the tip portion of the first superconductive conductor layer 131C.

For example, the length of the second superconductive conductor layer 132C extending from the electrical insulation layer 113, the length of the superconducting wire 102 for connection extending from the second superconductive conductor layer 132C, the length of the first superconductive conductor layer 131C extending from the superconducting wire 102 for connection and the length of the superconducting wire 101 for connection extending from the first superconductive conductor layer 131C are more desirably equal to one another.

The superconducting wire 100 facing up of each of the superconductive conductor layers 131C, 132C is made longer than the superconducting wire 100 facing down at the end portion. The ends of superconducting wires 101, 102 for connection extended from and connected with the superconducting wires 100 facing down are desirably aligned with the ends of the superconducting wires 100 facing up.

Thereby, when each of the superconductive conductor layers 131C, 132C is inserted into the conductor sleeve and is connected thereto via fusible material such as solder, the portions (portions X, Y in FIG. 8) of the superconductive conductor layers 131C, 132C which are to be connected with the conductor sleeves have substantially constant thickness and connecting the superconductive conductor layers 131C, 132C and the conductor sleeves in a more uniform manner along the circumferential direction of the cable core is made possible.

When electrical terminal structures are provided at the end portions of the superconducting cables 10B, 10D, 10E, 10F, 10G, 10H described above, the superconducting wires 101, 102 for connection same as those for the superconducting cable 10C are desirably provided at the superconducting wire 100 facing down which constitutes each of the superconductive conductor layers.

[Other]

The application of the present invention is not limited to the embodiments described above, but can be changed in appropriate within the scope of the present invention.

The connection structure and electrical terminal structure of the superconducting cables 10A and 10B, the superconducting cables 10C and 10D or the superconducting cables 10G and 10H may be applied to a three-phase cable including three cable cores of the superconducting cable, for example.

The superconducting cables which respectively include two superconductive conductor layers are shown as an example. However, this is not limitative. The superconducting cable may include one or multiple superconductive conductor layers.

INDUSTRIAL APPLICABILITY

The present inventions are a connection structure of superconducting cables, a superconducting cable, an electrical terminal structure of an end portion of a superconducting cable, which are applicable to a field in which a connection between the superconducting cables and a connection between the end portion of the superconducting cable and an external part are necessary.

DESCRIPTION OF REFERENCE NUMERALS 1 base plate
3 superconducting layer
10A, 10B, 10C, 10D, 10E, 10F, 10G, 10H superconducting cable
11A, 11B cable core
100 superconducting wire
101, 102 superconducting wire for connection
114A, 114B superconductive shielding layer
130A, 130B superconductive conductor layer
131A, 131B, 131C, 131D, 131E, 131F, 131G, 131H first superconductive conductor layer
132A, 132B, 132C, 132D, 132E, 132F, 132G, 132H second superconductive conductor layer
140 former

The invention claimed is:

1. A connection structure of a pair of superconducting cables each including a separate cable core including a former and a superconductive conductor layer composed of a plurality of superconducting wires arranged along an outer circumference of the former, wherein each of the plurality of superconducting wires has a laminated structure including a base plate and a superconducting layer formed on a side closer to one of principal surfaces of the base plate, at least one of the plurality of superconducting wires in the superconductive conductor layer of one of the superconducting cables is a first superconducting wire in which the superconducting layer is arranged inside of the base plate along a radial direction of the cable core, at least one of the plurality of superconducting wires in the superconductive conductor layer of another of the superconducting cables is a second superconducting wire in which the superconducting layer is arranged outside of the base plate along a radial direction of the cable core, the one of the superconducting cables and the another of the superconducting cables are connected with each other such that the superconducting layers of the first superconducting wire and the second superconducting wire face each other, the one of the superconducting cables and the another of the superconducting cables include a plurality of layers, and only tip portions of the superconducting layers of the one of the superconducting cables and the another of the superconducting cables are placed alternately between each other to form a connection, the connection is made by soldering with only the tip portions of the superconducting layers being in an overlapped state, and the pair of the superconducting cables are connected to each other to be a certain length.

2. The connection structure of superconducting cables according to claim 1, wherein a distribution of arrangement of the first superconducting wires along a circumferential direction of the cable core of the one of the superconducting cables and a distribution of arrangement of the second superconducting wires along a circumferential direction of the cable core of the another of the superconducting cables are identical.

3. The connection structure of superconducting cables according to claim 1, wherein the first superconducting wires and the second superconducting wires of the superconductive conductor layer of each of the superconducting cables are arranged so as to switch periodically along an outer circumference of the former.

4. The connection structure of superconducting cables according to claim 1, wherein the superconductive conductor layer of the one of the superconducting cables is composed only of the first superconducting wires and the superconductive conductor layer of the another of the superconducting cables is composed only of the second superconducting wires.

* * * * *